(12) United States Patent
Kanno (10) Patent No.: US 10,615,432 B2
(45) Date of Patent: Apr. 7, 2020

(54) CELL FRAME, CELL STACK, AND REDOX FLOW BATTERY

(71) Applicant: Sumitomo Electric Industries, Ltd., Osaka-shi (JP)

(72) Inventor: Takashi Kanno, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 20 days.

(21) Appl. No.: 15/561,856

(22) PCT Filed: Nov. 16, 2016

(86) PCT No.: PCT/JP2016/083981
§ 371 (c)(1),
(2) Date: Sep. 26, 2017

(87) PCT Pub. No.: WO2018/092215
PCT Pub. Date: May 24, 2018

(65) Prior Publication Data
US 2018/0358633 A1 Dec. 13, 2018

(51) Int. Cl.
*H01M 8/0273* (2016.01)
*H01M 8/026* (2016.01)
(Continued)

(52) U.S. Cl.
CPC ......... *H01M 8/0273* (2013.01); *H01M 8/026* (2013.01); *H01M 8/0258* (2013.01);
(Continued)

(58) Field of Classification Search
CPC ............. H01M 4/8615; H01M 4/8626; H01M 8/0232; H01M 8/0263; H01M 8/0234;
(Continued)

(56) References Cited

U.S. PATENT DOCUMENTS

| 7,670,719 B2* | 3/2010 | Nakaishi | H01M 8/0273 |
| | | | 429/105 |
| 2003/0087156 A1* | 5/2003 | Broman | H01M 4/8615 |
| | | | 429/235 |

(Continued)

FOREIGN PATENT DOCUMENTS

| CN | 103413956 A | * 11/2013 |
| JP | 2013-518362 A | 5/2013 |

(Continued)

OTHER PUBLICATIONS

Machine Translation and Abstract in English of CN-103413956. (Year: 2018).*

*Primary Examiner* — Robert S Jones
*Assistant Examiner* — Claire L Roe
(74) *Attorney, Agent, or Firm* — Baker Botts, L.L.P.; Michael A. Sartori (57) ABSTRACT

A cell frame includes a bipolar plate in contact with an electrode constituting a battery cell; and a frame body surrounding a periphery of the bipolar plate, wherein the frame body includes a liquid supply manifold through which an electrolyte is supplied into the battery cell, the bipolar plate includes, in a surface facing the electrode, a plurality of main groove portions that are arranged adjacent to one another and through which the electrolyte flows, at least one of the frame body and the bipolar plate includes a supply flow directing portion configured to distribute, in a direction in which the main groove portions are arranged adjacent to one another, the electrolyte supplied through the liquid supply manifold, to supply the electrolyte to each of the main groove portions, and each of widths Wi of electrolyte inlets of the main groove portions, and a width Wr of the supply flow directing portion in a direction orthogonal to the direction in which the main groove portions are arranged (Continued)

adjacent to one another, satisfy a width ratio Wr/Wi of 1.5 or more and 10 or less.

8 Claims, 5 Drawing Sheets

(51) Int. Cl.
 *H01M 8/2455* (2016.01)
 *H01M 8/18* (2006.01)
 *H01M 8/0258* (2016.01)
(52) U.S. Cl.
 CPC .......... *H01M 8/188* (2013.01); *H01M 8/2455* (2013.01); *Y02E 60/528* (2013.01)
(58) Field of Classification Search
 CPC ............. H01M 8/2483; H01M 8/0273; H01M 8/0297; Y02E 60/528
 USPC .................................... 429/235, 210, 236, 82
 See application file for complete search history.

(56) References Cited

U.S. PATENT DOCUMENTS

| | | | |
|---|---|---|---|
| 2012/0156535 A1* | 6/2012 | Harrer | H01M 8/0273 429/82 |
| 2012/0244395 A1* | 9/2012 | Perry | H01M 8/0265 429/51 |
| 2017/0237104 A1 | 8/2017 | Kanno et al. | |

FOREIGN PATENT DOCUMENTS

| | | |
|---|---|---|
| JP | 2015-122230 A | 7/2015 |
| JP | 2015-122231 A | 7/2015 |
| JP | 2015-138771 A | 7/2015 |
| JP | 2015-210849 A | 11/2015 |
| WO | 2011/089516 A2 | 7/2011 |
| WO | 2016/072192 A1 | 5/2016 |
| WO | 2016/072254 A1 | 5/2016 |
| WO | 2016/104613 A1 | 6/2016 |

* cited by examiner

CELL FRAME, CELL STACK, AND REDOX FLOW BATTERY

TECHNICAL FIELD

The present invention relates to a cell frame, a cell stack, and a redox flow battery.

BACKGROUND ART

Patent Literatures 1 to 4 disclose a redox flow battery including, as a main element, a battery cell including a positive electrode to which a positive electrolyte is supplied, a negative electrode to which a negative electrolyte is supplied, and a membrane disposed between the positive electrode and the negative electrode; the redox flow battery being configured to be charged and discharged while the electrolytes for the electrodes are supplied to the electrodes. The battery cell has a configuration in which a stack body of the positive electrode, the membrane, and the negative electrode is sandwiched between a pair of cell frames. Such a cell frame includes a bipolar plate on the front and back surfaces of which the positive electrode and the negative electrode are individually disposed, and a resin frame body disposed on the outer peripheral portion of the bipolar plate.

Patent Literatures 1 to 4 disclose a bipolar plate including plural groove portions through which electrolytes flow, in order to sufficiently distribute the electrolytes to the electrodes within the battery cell.

CITATION LIST

Patent Literature

PTL 1: Japanese Unexamined Patent Application Publication No. 2015-122230
PTL 2: Japanese Unexamined Patent Application Publication No. 2015-122231
PTL 3: Japanese Unexamined Patent Application Publication No. 2015-138771
PTL 4: Japanese Unexamined Patent Application Publication No. 2015-210849

SUMMARY OF INVENTION

A cell frame according to the present disclosure is
a cell frame including a bipolar plate in contact with an electrode constituting a battery cell; and a frame body surrounding a periphery of the bipolar plate,
wherein the frame body includes a liquid supply manifold through which an electrolyte is supplied into the battery cell,
the bipolar plate includes, in a surface facing the electrode, a plurality of main groove portions that are arranged adjacent to one another and through which the electrolyte flows,
at least one of the frame body and the bipolar plate includes a supply flow directing portion configured to distribute, in a direction in which the main groove portions are arranged adjacent to one another, the electrolyte supplied through the liquid supply manifold, to supply the electrolyte to each of the main groove portions, and
each of widths Wi of electrolyte inlets of the main groove portions, and a width Wr of the supply flow directing portion in a direction orthogonal to the direction in which the main groove portions are arranged adjacent to one another, satisfy a width ratio Wr/Wi of 1.5 or more and 10 or less.

A cell stack according to the present disclosure includes the cell frame according to the present disclosure.

A redox flow battery according to the present disclosure includes the cell stack according to the present disclosure.

DESCRIPTION OF EMBODIMENTS

Technical Problem

Electrolytes are individually supplied to the electrodes through liquid supply manifolds, liquid supply guide grooves, and supply flow directing portions that are formed in one of parts facing each other in a frame body. The electrolytes are individually drained from the electrodes through drainage flow directing portions, liquid drainage guide grooves, and liquid drainage manifolds that are formed in the other one of the parts facing each other in the frame body. The positive electrolyte (negative electrolyte) passes through a liquid supply manifold, then through a liquid supply guide groove formed in one surface (the other surface) of the frame body, is distributed, by a supply flow directing portion formed so as to be connected to the liquid supply guide groove, along an inner peripheral portion of one surface (the other surface) of the frame body, and is supplied to the positive electrode (negative electrode). Subsequently, the positive electrolyte (negative electrolyte) having passed through the positive electrode (negative electrode) is collected in a drainage flow directing portion formed in an inner peripheral portion of one surface (the other surface) of the frame body, passes through a liquid drainage guide groove formed so as to be connected to the drainage flow directing portion, and is drained into the liquid drainage manifold.

The electrolytes may be subjected to, for example, entry of an unwanted substance such as foreign matter during assembly of the redox flow battery, or gradual dissolution of materials from, for example, the battery cell, the circulation channels, and the tanks for electrolytes for the electrodes during repeated charge and discharge, which results in deposition of the materials as unwanted substances. When an electrolyte containing an unwanted substance is used to operate (charge or discharge) a redox flow battery, the unwanted substance may clog the supply flow directing portion, which is a part of the flow channels for the electrolyte. When the supply flow directing portion is clogged with an unwanted substance, the electrolyte is not supplied to the groove portions of the bipolar plate or the electrode. Thus, the battery reaction does not occur, which results in degradation of the battery performance.

Accordingly, an object of the present disclosure is to provide a cell frame, a cell stack, and a redox flow battery that enable suppression of clogging of a supply flow directing portion caused by an unwanted substance within an electrolyte, to thereby suppress degradation of the battery performance.

Advantageous Effects of Disclosure

The present disclosure can provide a cell frame, a cell stack, and a redox flow battery that enable suppression of clogging of a supply flow directing portion caused by an unwanted substance within an electrolyte, to thereby suppress degradation of the battery performance.

Description of Embodiments According to the Present Invention

Features of embodiments according to the present invention will be first listed and described.

(1) A cell frame according to an embodiment of the present invention is a cell frame including a bipolar plate in contact with an electrode constituting a battery cell; and a frame body surrounding a periphery of the bipolar plate, wherein the frame body includes a liquid supply manifold through which an electrolyte is supplied into the battery cell, the bipolar plate includes, in a surface facing the electrode, a plurality of main groove portions that are arranged adjacent to one another and through which the electrolyte flows, at least one of the frame body and the bipolar plate includes a supply flow directing portion configured to distribute, in a direction in which the main groove portions are arranged adjacent to one another, the electrolyte supplied through the liquid supply manifold, to supply the electrolyte to each of the main groove portions, and each of widths Wi of electrolyte inlets of the main groove portions, and a width Wr of the supply flow directing portion in a direction orthogonal to the direction in which the main groove portions are arranged adjacent to one another, satisfy a width ratio Wr/Wi of 1.5 or more and 10 or less.

In the cell frame, the width ratio Wr/Wi between the main groove portions and the supply flow directing portion satisfies the above-described range, which enables suppression of clogging of the supply flow directing portion caused by an unwanted substance that can enter the electrolyte, and which enables capture of such unwanted substances at the inlets of some main groove portions among plural main groove portions. Clogging of the supply flow directing portion caused by an unwanted substance can be suppressed, to thereby distribute the electrolyte over the whole region of the bipolar plate in the direction in which the main groove portions are arranged adjacent to one another. Unwanted substances are captured at the inlets of some main groove portions, which enables suppression of flowing of the unwanted substances into an electrode in contact with the bipolar plate, to thereby suppress a problem caused by a reaction between the unwanted substances and the electrode (for example, generation of gas due to a catalytic reaction). Unwanted substances may be captured at the inlets of some main groove portions, but clogging of the supply flow directing portion caused by an unwanted substance can be suppressed, which enables flowing of the electrolyte into the other main groove portions. Thus, the cell frame enables sufficient supply of the electrolyte to the electrode, compared with a case in which the supply flow directing portion is clogged with an unwanted substance.

The width ratio Wr/Wi between the main groove portions and the supply flow directing portion satisfies 1.5 or more, that is, the width Wr of the supply flow directing portion is sufficiently larger than the widths Wi of the main groove portions. This enables suppression of clogging of the supply flow directing portion caused by an unwanted substance, and enables capture of unwanted substances at the inlets of main groove portions. On the other hand, the width ratio Wr/Wi between the main groove portions and the supply flow directing portion satisfies 10 or less, which enables a reduction in the pressure loss of the electrolyte that can be caused by sudden changes from the width Wr of the supply flow directing portion to much smaller widths Wi of the main groove portions. This can prevent unwanted substances from reaching deep into the main groove portions, to thereby prevent unwanted substances from flowing into the electrode. Thus, the cell frame enables sufficient supply of an electrolyte to an electrode, and enables suppression of flowing of unwanted substances into an electrode, to thereby suppress degradation of the battery performance.

(2) The above-described cell frame may have, for example, a configuration in which the width Wr of the supply flow directing portion satisfies 0.75 mm or more and 50 mm or less.

When the width Wr of the supply flow directing portion satisfies 0.75 mm or more, this enables suppression of clogging of the supply flow directing portion caused by an unwanted substance, to thereby distribute the electrolyte over the whole region of the bipolar plate in the direction in which the main groove portions are arranged adjacent to one another. On the other hand, when the width Wr of the supply flow directing portion satisfies 50 mm or less, this enables suppression of an increase in the size of the cell frame or a decrease in the size of an electrode due to an excessively large width of the supply flow directing portion.

(3) The above-described cell frame may have, for example, a configuration in which the widths Wi of the inlets of the main groove portions satisfy 0.5 mm or more and 5 mm or less.

When the widths Wi of the main groove portions satisfy 0.5 mm or more, this enables suppression of an increase in the flow resistance due to excessively small widths of the main groove portions. On the other hand, when the widths Wi of the main groove portions satisfy 5 mm or less, this enables capture of unwanted substances at the inlets of the main groove portions.

(4) The above-described cell frame may have, for example, a configuration in which the supply flow directing portion includes a cutout portion formed in the frame body so as to extend in the direction in which the main groove portions are arranged adjacent to one another, and the inlets of the main groove portions are formed so as to be connected to the cutout portion.

The supply flow directing portion may be constituted by a cutout portion formed in the frame body. In this case, when the inlets of the main groove portions are formed so as to be connected to the cutout portion, this enables distribution of the electrolyte over the whole region in the direction in which the main groove portions are arranged adjacent to one another.

(5) The above-described cell frame may have, for example, a configuration in which the supply flow directing portion includes a distribution groove portion formed in the bipolar plate so as to be connected to the inlets of the main groove portions and so as to extend in the direction in which the main groove portions are arranged adjacent to one another, and the frame body includes a liquid supply guide groove that connects the distribution groove portion and the liquid supply manifold to each other.

The supply flow directing portion can be constituted by a distribution groove portion formed in the bipolar plate. In this case, when the liquid supply guide groove portion connecting the distribution groove portion and the liquid supply manifold to each other is formed in the frame body, this enables distribution of the electrolyte supplied through the liquid supply manifold, over the whole region in the direction in which the main groove portions are arranged adjacent to one another.

(6) A cell stack according to an embodiment of the present invention includes the cell frame according to any one of (1) to (5) above.

The above-described cell stack, which includes a cell frame according to an embodiment of the present invention, enables suppression of clogging of the supply flow directing portion caused by an unwanted substance that can enter the electrolyte, and enables capture of such unwanted substances at the inlets of some main groove portions among plural main groove portions. This enables sufficient supply of the electrolyte to the electrode, and enables suppression of flowing of an unwanted substance into the electrode, to thereby suppress degradation of the battery performance.

(7) A redox flow battery according to an embodiment of the present invention includes the cell stack according to (6) above.

The above-described redox flow battery, which includes a cell stack according to an embodiment of the present invention, enables suppression of clogging of the supply flow directing portion caused by an unwanted substance that can enter the electrolyte, and enables capture of such unwanted substances at the inlets of some main groove portions among plural main groove portions. This enables sufficient supply of the electrolyte to the electrode, and enables suppression of flowing of an unwanted substance into the electrode, to thereby suppress degradation of the battery performance.

DETAILS OF EMBODIMENTS ACCORDING TO THE PRESENT INVENTION

Figure 3:
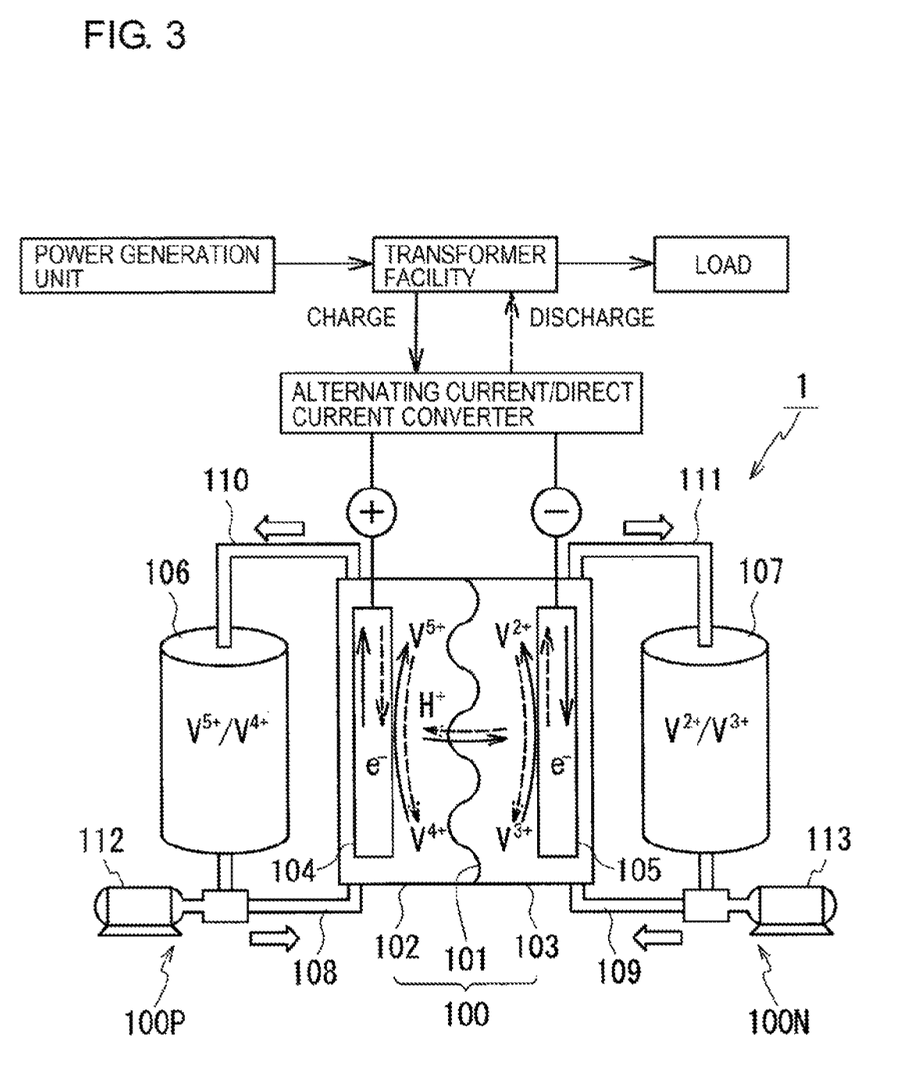
FIG. 3 illustrates the principle of operations of a redox flow battery according to an embodiment.
Figure 4:
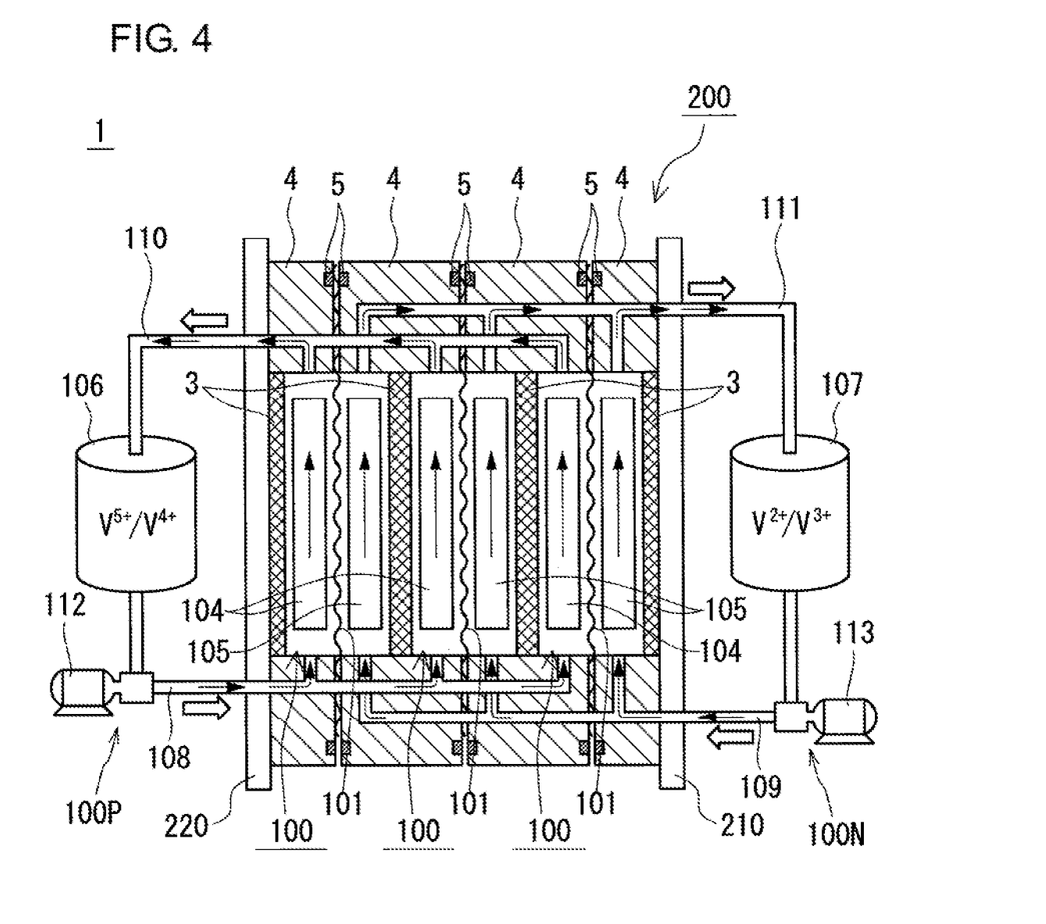
FIG. 4 is a schematic configuration view of a redox flow battery according to an embodiment.
Figure 5:
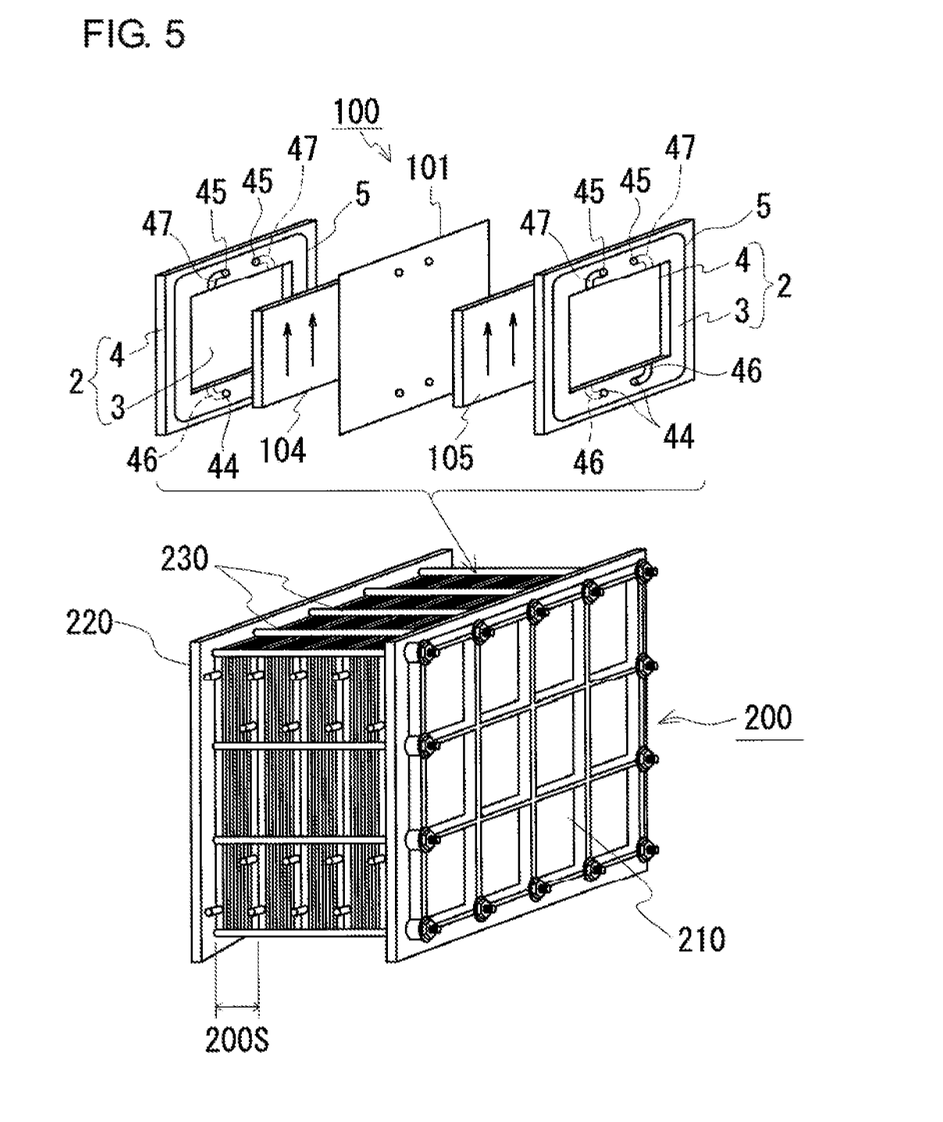
FIG. 5 is a schematic configuration view of a cell stack of a redox flow battery according to an embodiment.

Hereinafter, cell frames, a cell stack, and a redox flow battery (RF battery) according to embodiments of the present invention will be described in detail with reference to drawings. Like reference signs in drawings denote elements having the same name. Referring to FIG. 3 to FIG. 5, the basic configuration of an RF battery 1 according to an embodiment will be first described. Subsequently referring mainly to FIG. 1 and FIG. 2, cell frames according to embodiments in the RF battery 1 according to the embodiment will be described. Incidentally, the present invention is not limited to such examples. The present invention is defined by Claims and is intended to embrace all the modifications within the meaning and range of equivalency of the Claims.

[RF Battery]

As illustrated in FIG. 3, typically, the RF battery 1 is connected via, for example, an alternating current/direct current converter and a transformer facility to a power generation unit and a load such as a power system or a consumer; the RF battery 1 is charged with the power generation unit serving as a power supply source and is discharged to supply electric power to the load. Examples of the power generation unit include a solar photovoltaic power generator, a wind power generator, and other ordinary power plants.

The RF battery 1 includes a battery cell 100, which is divided by a membrane 101 into a positive electrode cell 102 and a negative electrode cell 103. The positive electrode cell 102 includes therein a positive electrode 104 to which a positive electrolyte is supplied. The negative electrode cell 103 includes therein a negative electrode 105 to which a negative electrolyte is supplied. The RF battery 1 typically includes plural battery cells 100, which include, between adjacent battery cells 100 and 100, a cell frame 2 (FIG. 5) including a bipolar plate 3.

The positive electrode 104 and the negative electrode 105 are reaction sites where active material ions contained in the supplied electrolytes cause battery reactions. The membrane 101 is a separation member that separates the positive electrode 104 and the negative electrode 105 from each other, and that is permeable to predetermined ions. The bipolar plate 3 is a conductive member that is disposed between the positive electrode 104 and the negative electrode 105, and that conducts an electric current, but is impermeable to electrolytes. As illustrated in FIG. 5, the cell frame 2 includes the bipolar plate 3, and a frame body 4, which surrounds the periphery of the bipolar plate 3.

A positive electrode circulation mechanism 100P, which is configured to circulate and supply the positive electrolyte to the positive electrode cell 102, includes a positive electrolyte tank 106 storing the positive electrolyte, ducts 108 and 110 connecting the positive electrolyte tank 106 and the positive electrode cell 102 to each other, and a pump 112 provided in the upstream (supply) duct 108. A negative electrode circulation mechanism 100N, which is configured to circulate and supply the negative electrolyte to the negative electrode cell 103, includes a negative electrolyte tank 107 storing the negative electrolyte, ducts 109 and 111 connecting the negative electrolyte tank 107 and the negative electrode cell 103 to each other, and a pump 113 provided in the upstream (supply) duct 109.

The positive electrolyte is supplied from the positive electrolyte tank 106 through the upstream duct 108 to the positive electrode 104, and is returned from the positive electrode 104 through the downstream (drainage) duct 110 to the positive electrolyte tank 106. The negative electrolyte is supplied from the negative electrolyte tank 107 through the upstream duct 109 to the negative electrode 105, and is returned from the negative electrode 105 through the downstream (drainage) duct 111 to the negative electrolyte tank 107. The circulation of the positive electrolyte and the circulation of the negative electrolyte cause circulation and supply of the positive electrolyte to the positive electrode 104, and circulation and supply of the negative electrolyte to the negative electrode 105, during which valence change reactions of active material ions in the electrolytes at the electrodes occur to thereby achieve charge or discharge. In FIG. 3 and FIG. 4, the vanadium ions described in the positive electrolyte tank 106 and in the negative electrolyte tank 107 are an example of ion species contained as active materials in the positive electrolyte and in the negative electrolyte. In FIG. 3, solid-line arrows indicate charge and broken-line arrows indicate discharge.

The RF battery 1 typically employs a configuration referred to as a cell stack 200 in which plural battery cells 100 are stacked. As illustrated in FIG. 5, the cell stack 200 includes a stack body in which a cell frame 2, a positive electrode 104, a membrane 101, a negative electrode 105, and another cell frame 2 are repeatedly stacked, a pair of end plates 210 and 220 between which the stack body is sandwiched, coupling members 230 such as long bolts and fastening members such as nuts that join the end plates 210 and 220 together. The fastening members are used to fasten the end plates 210 and 220 together, so that the fastening force in the stacking direction maintains the stack state of the stack body. The cell stack 200 employs a configuration in which a predetermined number of battery cells 100 are used to provide a substack 200S, and plural substacks 200S are stacked. In the cell frames 2 located at, in the stacking direction of the battery cells 100, both ends of the substack 200S or the cell stack 200, instead of the bipolar plates 3, supply/drainage plates (not shown) are disposed.

The electrolytes for the electrodes are supplied to the positive electrode 104 and the negative electrode 105, through liquid supply manifolds 44, liquid supply guide grooves 46, and supply flow directing portions (not shown), which are formed in one of parts facing each other (liquid supply-side part, illustrated as a lower part in FIG. 5) of the frame body 4 in the cell frame 2. The electrolytes for the electrodes are drained from the positive electrode 104 and the negative electrode 105, through drainage flow directing portions (not shown), liquid drainage guide grooves 47, and liquid drainage manifolds 45, which are formed in the other one of parts facing each other (liquid drainage-side part, illustrated as an upper part in FIG. 5) of the frame body 4. The positive electrolyte passes through the liquid supply manifold 44, then through the liquid supply guide groove 46 formed in one of the surfaces (surface illustrated as being exposed in the drawing) of the frame body 4, is distributed, along an inner peripheral portion of the one surface of the frame body 4, in a supply flow directing portion formed so as to be connected to the liquid supply guide groove 46, and is supplied to the positive electrode 104. Subsequently, as illustrated with the arrows in the upper drawing of FIG. 5, the positive electrolyte flows from the lower side to the upper side of the positive electrode 104, is collected in the drainage flow directing portion formed in an inner peripheral portion of the one surface (surface illustrated as being exposed in the drawing) of the frame body 4, passes through the liquid drainage guide groove 47 formed so as to be connected to the drainage flow directing portion, and is drained into the liquid drainage manifold 45. The negative electrolyte is supplied and drained as with the positive electrolyte except that the supply and drainage are performed in the other surface (surface illustrated as being hidden in the drawing) of the frame body 4. Loop-shaped sealing members 5 such as O-rings or flat gaskets are individually disposed between frame bodies 4, to thereby suppress leakage of the electrolytes from the battery cells 100.

The basic configuration of the RF battery 1 may be appropriately selected from known configurations.

[Main Features of RF Battery]

The RF battery 1 according to the embodiment has a feature of employing a cell frame that enables suppression of clogging of a supply flow directing portion that is a part of the flow channels for an electrolyte, the clogging being caused by an unwanted substance that can enter the electrolyte, and that enables suppression of flowing of such an unwanted substance into an electrode. Hereinafter, a cell frame included in the RF battery 1 according to the above-described embodiment will be described in detail.

Embodiment 1

Figure 1:
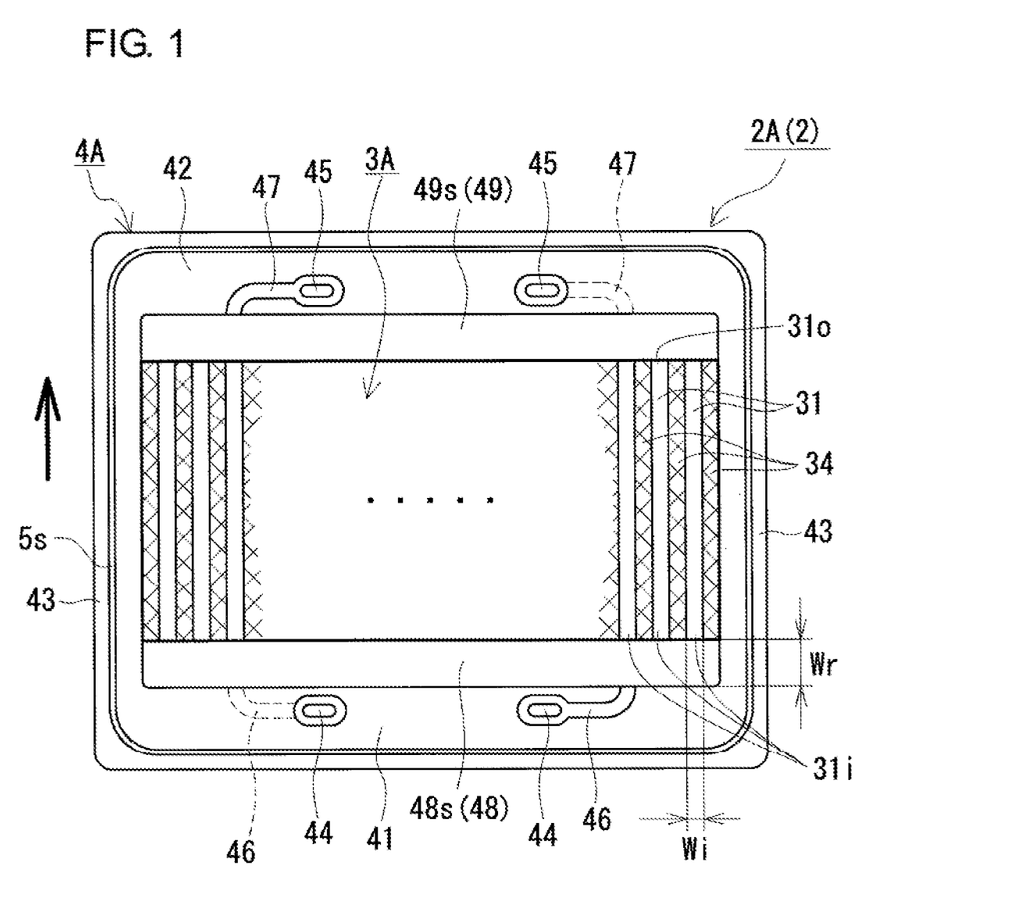
FIG. 1 is a schematic plan view of a cell frame according to Embodiment 1.

Referring to FIG. 1, a cell frame 2A according to Embodiment 1 will be described. This cell frame 2A is a member corresponding to the above-described cell frame 2. The cell frame 2A includes a bipolar plate 3A, which is in contact with the positive electrode 104 and the negative electrode 105, which constitute the battery cell 100 (FIG. 5): and a frame body 4A, which surrounds the periphery of the bipolar plate 3A. The bipolar plate 3A includes, in its front and back surfaces, plural main groove portions 31, which are arranged adjacent to one another and through which electrolytes flow. The frame body 4A includes liquid supply manifolds 44, through which electrolytes are supplied into the battery cell 100; supply flow directing portions 48, which are constituted by cutout portions 48s, which are formed so as to extend in the direction in which the main groove portions 31 are arranged adjacent to one another; and liquid supply guide grooves 46, which connect such a liquid supply manifold 44 and such a supply flow directing portion 48 to each other. Inlets 31i of the main groove portions 31 are individually formed so as to be connected to the supply flow directing portions 48 (cutout portions 48s).

The cell frame 2A according to Embodiment 1 has a feature that each of widths Wi of the electrolyte inlets 31i of the main groove portions 31, and the width Wr of the supply flow directing portions 48 in the direction orthogonal to the direction in which the main groove portions 31 are arranged adjacent to one another, satisfy a width ratio Wr/Wi of 1.5 or more and 10 or less. The width ratio Wr/Wi satisfying such a range enables suppression of clogging of the supply flow directing portions 48 caused by unwanted substances that can enter the electrolytes, and enables capture of such unwanted substances at the inlets 31i of some main groove portions 31 among the main groove portions 31. Suppression of clogging of the supply flow directing portions 48 caused by unwanted substances, enables distribution of the electrolytes over the whole region in the direction in which the main groove portions 31 are arranged adjacent to one another, to thereby supply the electrolytes to plural main groove portions 31. Capture of unwanted substances at the inlets 31i of some main groove portions 31 enables suppression of flowing of the unwanted substances into the electrodes in contact with the bipolar plate 3A. When unwanted substances are captured at the inlets 31i of some main groove portions 31, the electrolytes are less likely to flow through or do not flow through these main groove portions 31; however, the supply flow directing portions 48 enable distribution of the electrolytes, so that the electrolytes can flow through the other main groove portions 31.

(Bipolar Plate)

The bipolar plate 3A basically separates adjacent battery cells 100 (FIG. 5). The bipolar plate 3A is a flat plate having a rectangular shape. On the front and back surfaces of the bipolar plate 3A, the positive electrode 104 and the negative electrode 105 of adjacent battery cells 100 are individually disposed. The bipolar plate 3A includes, in a surface facing the positive electrode 104 and in a surface facing the negative electrode 105, plural main groove portions 31 formed so as to be arranged adjacent to one another. The plural main groove portions 31 function as channels through which the electrolytes flow. In the main groove portions 31 formed in one surface of the bipolar plate 3A, the one surface facing the positive electrode 104, the positive electrolyte flows. In the main groove portions 31 formed in the other surface of the bipolar plate 3A, the other surface facing the negative electrode 105, the negative electrolyte flows. Flows of the electrolytes within each battery cell 100 can be controlled with, for example, the shape or size of the main groove portions 31.

In this example, the main groove portions 31 are constituted by vertical grooves that extend in a direction (along coupling parts 43) from a liquid supply-side part 41 toward a liquid drainage-side part 42 of the frame body 4A described later. A ridge portion 34 is formed between adjacent main groove portions 31. In FIG. 1, for convenience of explanation, such ridge portions 34 are illustrated as hatched areas. The electrolytes flowing on the bipolar plate 3A form flows along the main groove portions 31, and flows across the ridge portions 34.

In the main groove portions 31, the widths Wi of the electrolyte inlets 31i preferably satisfy 0.5 mm or more and 5 mm or less. The main groove portions 31 may be formed so as to have any cross-sectional shape and examples of the shape include a rectangular shape and a semicircular shape. When the main groove portions 31 have a cross-sectional shape whose width is not constant from its opening portion toward its bottom portion, such as a semicircular shape, the maximum width is employed as the width Wi. In this example, the main groove portions 31 have a cross-sectional shape that is a rectangular shape whose width is constant from its opening portion toward its bottom portion. The widths Wi satisfying 0.5 mm or more enable suppression of an increase in the flow resistance against the electrolytes caused by excessively small widths of the main groove portions 31. On the other hand, the widths Wi satisfying 5 mm or less enable capture of unwanted substances that can enter the electrolytes. In order to capture unwanted substances at the inlets 31i of the main groove portions 31, the widths Wi are preferably small, more preferably 3 mm or less, particularly preferably 1 mm or less.

In plural main groove portions 31, the electrolyte inlets 31i may all have the same width Wi, or may have different widths Wi. In plural main groove portions 31, when the electrolyte inlets 31i have different widths Wi, the widths Wi of all the inlets 31i satisfy the above-described range. As a result, even when an unwanted substance that can enter the electrolytes drifts to any one of the main groove portions 31, the unwanted substance can be captured at the inlet 31i of the main groove portion 31, to thereby suppress flowing of the unwanted substance into the electrodes.

The width of such a main groove portion 31 may be constant in its longitudinal direction, may increase or conversely may decrease from the inlet 31i toward an outlet 31o, or may vary in the longitudinal direction. In this example, the width is constant in the longitudinal direction.

The material for the bipolar plate 3A may be a material that conducts an electric current, but is impermeable to the electrolytes. In addition, the material preferably has acid resistance and an appropriate rigidity. Examples of the material for the bipolar plate 3A include conductive plastics formed from graphite and a polyolefin organic compound or a chlorinated organic compound; and such conductive plastics in which the graphite is partially substituted by at least one of carbon black and diamond-like carbon. Examples of the polyolefin organic compound include polyethylene, polypropylene, and polybutene. Examples of the chlorinated organic compound include vinyl chloride, chlorinated polyethylene, and chlorinated paraffin. When the bipolar plate 3A is formed from such a material, the bipolar plate 3A can be formed so as to have a lower electric resistance and high acid resistance.

(Frame Body)

The frame bodies 4A form, therebetween, a region that functions as the battery cell 100 (FIG. 5). Such a frame body 4A includes a liquid supply-side part 41; a liquid drainage-side part 42, which faces the liquid supply-side part 41; and a pair of coupling parts 43, which couples the end portions of the liquid supply-side part 41 to the end portions of the liquid drainage-side part 42, and which faces each other and is orthogonal to the liquid supply-side part 41 and the liquid drainage-side part 42. The frame body 4A has a rectangular frame shape. The liquid supply-side part 41 and the liquid drainage-side part 42 constitute the long parts of the rectangular frame, while the coupling parts 43 constitute the short parts of the rectangular frame. In the cell frame 2A viewed in plan, a direction in which the liquid supply-side part 41 and the liquid drainage-side part 42 face each other is referred to as a vertical direction, and a direction orthogonal to the vertical direction is referred to as a horizontal direction; in this case, the liquid supply-side part 41 is positioned in a lower area in the vertical direction, and the liquid drainage-side part 42 is positioned in an upper area in the vertical direction. The electrolytes flow in a direction, in the frame body 4A, from a lower area in the vertical direction toward an upper area in the vertical direction.

The frame body 4A has a thickness larger than the thickness of the bipolar plate 3A. Thus, when the periphery of the bipolar plate 3A is surrounded by the frame body 4A, the front surface (back surface) of the bipolar plate 3A and the front surface (back surface) of the frame body 4A have a difference in level, which forms a space in which the positive electrode 104 (negative electrode 105) is disposed.

Liquid Supply-Side Part

The liquid supply-side part 41 includes liquid supply manifolds 44, through which the electrolytes are supplied into the battery cells 100; liquid supply guide grooves 46, which extend from the liquid supply manifolds 44: and supply flow directing portions 48, which distribute the electrolytes supplied through the liquid supply guide grooves 46, in the direction in which the main groove portions 31 are arranged adjacent to one another in the bipolar plate 3A. The supply flow directing portions 48 are constituted by cutout portions 48s, which are formed in the liquid supply-side part 41 so as to extend in the direction in which the main groove portions 31 are arranged adjacent to one another. The cutout portions 48s are long thin-plate-shaped spaces formed by cutting out, for a predetermined width, in the front and back surfaces of the inner peripheral portion of the liquid supply-side part 41. These cutout portions 48s form stepped portions in the front and back surfaces of the inner peripheral portion of the liquid supply-side part 41; and an inner peripheral portion between the stepped portions of the front and back surfaces is a thin portion. The electrolytes flow, over the thin portion as the bottom surfaces, through the cutout portions 48s. When the cell stack 200 (FIG. 5) is constructed, the liquid supply guide grooves 46 and the supply flow directing portions 48 are covered by protective plates formed of plastic (not shown). This enables, without leakage of the electrolytes from the liquid supply guide grooves 46 or the supply flow directing portions 48, flowing of the electrolytes between the liquid supply manifolds 44 and the bipolar plate 3A.

The inlets 31i of the main groove portions 31 of the bipolar plate 3A are formed so as to be connected to the supply flow directing portions 48 of the frame body 4A. As a result, the electrolytes supplied through the liquid supply manifolds 44, pass through the liquid supply guide grooves 46; are distributed, in the supply flow directing portions 48, in the direction in which the main groove portions 31 are arranged adjacent to one another in the bipolar plate 3A, to reach the whole regions in the width direction of the bipolar plate 3A; reach the inlets 31i of the main groove portions 31; and flow through the whole regions of the electrodes. In this example, the bottom surface of a liquid supply guide groove 46, the bottom surface of a supply flow directing portion 48, and the bottom surfaces of main groove portions 31 are substantially flush with each other. The bottom surfaces may have, therebetween, stepped portions.

The supply flow directing portions 48 have a width Wr in the direction (in the vertical direction) orthogonal to the direction in which the main groove portions 31 are arranged adjacent to one another, such that a width ratio Wr/Wi of the width Wr to each of the widths Wi of the inlets 31*i* of the main groove portions 31 satisfies 1.5 or more and 10 or less. The width Wr of such a supply flow directing portion 48 is, in the cell frame 2A viewed in plan, a length, in this plan, in the direction orthogonal to the direction in which the main groove portions 31 are arranged adjacent to one another. In other words, the width Wr of the supply flow directing portion 48 is a length in a direction that is orthogonal to the direction in which the main groove portions 31 are arranged adjacent to one another and that is orthogonal to the depth direction of the main groove portions 31. The supply flow directing portion 48 may have any cross-sectional shape and examples of the shape include a rectangular shape whose width is constant from its opening portion toward its bottom portion. The supply flow directing portion 48 may have a cross-sectional shape whose width is not constant from its opening portion toward its bottom portion. In this case, the minimum width is employed as the width Wr. In this example, the supply flow directing portions 48 have a cross-sectional shape that is a rectangular shape whose width is constant from its opening portion toward its bottom portion.

Wr/Wi being 1.5 or more enables suppression of clogging of the supply flow directing portions 48 caused by unwanted substances that can enter the electrolytes. On the other hand, Wr/Wi being 10 or less enables a reduction in the pressure loss of the electrolytes that can be caused by sudden changes from the width Wr of the supply flow directing portions 48 to much smaller widths Wi of the main groove portions 31. This can prevent unwanted substances from reaching deep into the main groove portions 31, to thereby prevent unwanted substances from flowing into the electrodes. In addition, when the electrodes are formed so as to have a specified size, an increase in the size of the liquid supply-side part 41 can be suppressed, which results in suppression of an increase in the size of the cell frame 2A. Alternatively, when the cell frame 2A is formed so as to have a specified size, a decrease in the size of the electrodes can be suppressed. In order to suppress clogging of the supply flow directing portions 48 caused by unwanted substances, the width ratio Wr/Wi is preferably higher, more preferably 5 or more, particularly preferably 7 or more. The width Wr of the supply flow directing portions 48 may satisfy, for example, 0.75 mm or more and 50 mm or less, or further 2.5 mm or more and 35 mm or less.

The supply flow directing portions 48 may have a constant width in the direction in which the main groove portions 31 are arranged adjacent to one another, or may have a wider portion. When the width varies, the minimum width is employed as Wr. In this example, the width is constant in the direction in which the main groove portions 31 are arranged adjacent to one another.

Liquid Drainage-Side Part

The liquid drainage-side part 42 includes drainage flow directing portions 49 in which the electrolytes drained from the bipolar plate 3A are collected; liquid drainage guide grooves 47, which guide the electrolytes from the drainage flow directing portions 49 to liquid drainage manifolds 45; and the liquid drainage manifolds 45 through which the electrolytes are drained to the outside of the battery cells 100. The drainage flow directing portions 49 are constituted by cutout portions 49*s*, which are formed in the liquid drainage-side part 42 so as to extend in the direction in which the main groove portions 31 are arranged adjacent to one another. The cutout portions 49*s* are long thin-plate-shaped spaces formed by cutting out, for a predetermined width, in the front and back surfaces of the inner peripheral portion of the liquid drainage-side part 42. These cutout portions 49*s* form stepped portions in the front and back surfaces of the inner peripheral portion of the liquid drainage-side part 42; and an inner peripheral portion between the stepped portions of the front and back surfaces is a thin portion. The electrolytes flow, over the thin portion as the bottom surfaces, through the cutout portions 49*s*. When the cell stack 200 (FIG. 5) is constructed, the liquid drainage guide grooves 47 and the drainage flow directing portions 49 are covered by protective plates formed of plastic (not shown). This enables, without leakage of the electrolytes from the liquid drainage guide grooves 47 or the drainage flow directing portions 49, flowing of the electrolytes between the bipolar plate 3A and the liquid drainage manifolds 45.

The outlets 31*o* of the main groove portions 31 of the bipolar plate 3A are formed so as to be connected to the drainage flow directing portions 49 of the frame body 4A. As a result, the electrolytes drained from the bipolar plate 3A (electrodes), are collected in the drainage flow directing portions 49 in the direction in which the main groove portions 31 are arranged adjacent to one another in the bipolar plate 3A, pass through the liquid drainage guide grooves 47, and are drained through the liquid drainage manifolds 45. In this example, the bottom surfaces of main groove portions 31, the bottom surface of a drainage flow directing portion 49, and the bottom surface of a liquid drainage guide groove 47 are substantially flush with each other. The bottom surfaces may have, therebetween, stepped portions.

The material for the frame body 4A is, for example, a material that appropriately has acid resistance, electrical insulating properties, and mechanical properties. Examples of the material for the frame body 4A include various fluororesins such as polytetrafluoroethylene, polypropylene resins, polyethylene resins, and vinyl chloride resins.

The frame body 4A has a sealing groove 5*s*, which is formed in the peripheral direction of the frame body 4A and in which a loop-shaped sealing member 5 (FIG. 5) is disposed.

Embodiment 2

Figure 2:
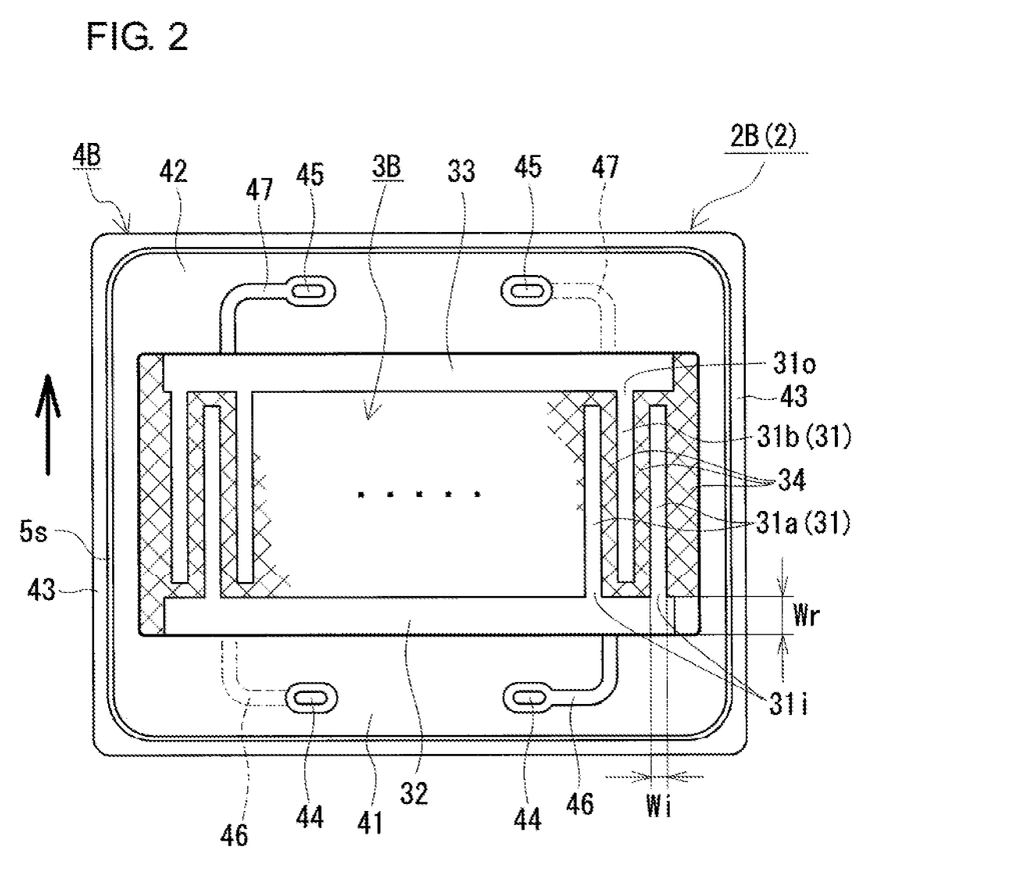
FIG. 2 is a schematic plan view of a cell frame according to Embodiment 2.

Referring to FIG. 2, a cell frame 2B according to Embodiment 2 will be described. This cell frame 2B is mainly different from the cell frame 2A according to Embodiment 1 in that the supply flow directing portions are formed in a bipolar plate 3B. In addition, the cell frame 2B is different in terms of the shape of main groove portions 31 formed in the bipolar plate 3B, compared with the bipolar plate 3A according to Embodiment 1. Hereinafter, differences from the cell frame 2A according to Embodiment 1 will be mainly described.

(Bipolar Plate)

The bipolar plate 3B includes, as main groove portions 31, introduction-side main groove portions 31*a* through which the electrolytes are introduced into the electrodes, and drainage-side main groove portions 31*b* through which the electrolytes are drained from the electrodes. The introduction-side main groove portions 31*a* are not connected to and are independent from the drainage-side main groove portions 31*b*; and the introduction-side main groove portions 31*a* and the drainage-side main groove portions 31*b* are alternately arranged adjacent to one another at predetermined intervals so as to constitute, together with distribution groove portions 32 and collection groove portions 33 described later, an interdigital structure. The introduction-side main groove portions 31a have electrolyte inlets 31i. The drainage-side main groove portions 31b have electrolyte outlets 31o. A ridge portion 34 is formed between an introduction-side main groove portion 31a and a drainage-side main groove portion 31b that are adjacent to each other.

The bipolar plate 3B includes, as supply flow directing portions, distribution groove portions 32, which are formed so as to be connected to the inlets 31i of the introduction-side main groove portions 31a and so as to extend in the direction in which the introduction-side main groove portions 31a are arranged adjacent to one another. The distribution groove portions 32 are connected, via liquid supply guide grooves 46 formed in the frame body 4B described later, to the liquid supply manifolds 44. In this example, the main groove portions 31 are constituted by vertical grooves that extend in a direction from a liquid supply-side part 41 toward a liquid drainage-side part 42 of the frame body 4B; and the distribution groove portions 32 are constituted by horizontal grooves that extend in a direction across a pair of coupling parts 43 of the frame body 4B.

The bipolar plate 3B includes, as drainage flow directing portions, collection groove portions 33, which are formed so as to be connected to the outlets 31o of the drainage-side main groove portions 31b and so as to extend in the direction in which the drainage-side main groove portions 31b are arranged adjacent to one another. The collection groove portions 33 are connected, via liquid drainage guide grooves 47 formed in the frame body 4B described later, to the liquid drainage manifolds 45. In this example, the collection groove portions 33 are constituted by horizontal grooves as in the distribution groove portions 32.

(Frame Body)

The frame body 4B includes, in the liquid supply-side part 41, the liquid supply manifolds 44 and the liquid supply guide grooves 46. The liquid supply guide grooves 46 are formed so as to connect the distribution groove portions 32 formed in the bipolar plate 3B to the liquid supply manifolds 44. As a result, the electrolytes supplied through the liquid supply manifolds 44, pass through the liquid supply guide grooves 46; are distributed, in the distribution groove portions 32 of the bipolar plate 3B, to reach the whole regions in the width direction of the bipolar plate 3B; reach the inlets 31i of the introduction-side main groove portions 31a; and flow through the whole regions of the electrodes. In this example, the bottom surface of a liquid supply guide groove 46, the bottom surface of a distribution groove portion 32, and the bottom surfaces of introduction-side main groove portions 31a are substantially flush with each other. The bottom surfaces may have, therebetween, stepped portions.

The frame body 4B includes, in the liquid drainage-side part 42, the liquid drainage manifolds 45 and the liquid drainage guide grooves 47. The liquid drainage guide grooves 47 are formed so as to connect the collection groove portions 33 formed in the bipolar plate 3B to the liquid drainage manifolds 45. As a result, the electrolytes drained through the outlets 31o of the drainage-side main groove portions 31b, are collected in the collection groove portions 33, pass through the liquid drainage guide grooves 47, and are drained through the liquid drainage manifolds 45. In this example, the bottom surfaces of drainage-side main groove portions 31b, the bottom surface of a collection groove portion 33, and the bottom surface of a liquid drainage guide groove 47 are substantially flush with each other. The bottom surfaces may have, therebetween, stepped portions.

As with the cell frame 2A according to Embodiment 1, the cell frame 2B according to Embodiment 2 has a feature that each of the widths Wi of the electrolyte inlets 31i of the introduction-side main groove portions 31a (main groove portions 31), and the width Wr of the distribution groove portions 32 (supply flow directing grooves) in a direction orthogonal to the direction in which the introduction-side main groove portions 31a are arranged adjacent to one another, satisfy a width ratio Wr/Wi of 1.5 or more and 10 or less. This enables suppression of clogging of the distribution groove portions 32 caused by unwanted substances that can enter the electrolytes, and enables capture of such unwanted substances at the inlets 31i of some introduction-side main groove portions 31a among the introduction-side main groove portions 31a.

<<Modifications>>

In the cell frame 2A according to Embodiment 1 and the cell frame 2B according to Embodiment 2, the main groove portions and the supply flow directing portions may employ the following configurations.

(1) The main groove portions are each a single vertical groove that connects an inlet and an outlet to each other (refer to FIG. 1). The supply flow directing portions are distribution groove portions that are formed in the bipolar plate so as to be connected to the inlets and so as to extend in the direction in which the main groove portions are arranged adjacent to one another (refer to FIG. 2). The drainage flow directing portions may be collection groove portions that are formed in the bipolar plate so as to be connected to the outlets and so as to extend in the direction in which the main groove portions are arranged adjacent to one another, or may be cutout portions formed in the frame body.

(2) The main groove portions are vertical grooves in which introduction-side main groove portions having an inlet are not connected to and are independent from drainage-side main groove portions having an outlet (refer to FIG. 2). The supply flow directing portions are cutout portions that are formed in the frame body so as to be connected to the inlets of the introduction-side groove portions and so as to extend in the direction in which the main groove portions are arranged adjacent to one another (refer to FIG. 1). The drainage flow directing portions may be collection groove portions formed in the bipolar plate so as to be connected to the outlets and so as to extend in the direction in which the main groove portions are arranged adjacent to one another, or may be cutout portions formed in the frame body.

(3) When the main groove portions include introduction-side groove portions and drainage-side groove portions, the introduction-side main groove portions and the drainage-side main groove portions are not alternately disposed so as to interdigitate, but are disposed such that the introduction-side main groove portions face, with a gap in the electrolyte flow direction, the drainage-side main groove portions.

(4) The main groove portions have a horizontal groove structure. In this case, the supply flow directing portions and the drainage flow directing portions are disposed in the vertical direction.

Test Examples

Plural RF batteries (Test bodies A to J) were produced so as to include a cell frame (FIG. 1) including a bipolar plate having plural main groove portions having a vertical groove structure in the front and back surfaces, and a frame body having cutout portions as supply flow directing portions. Each of the RF batteries was subjected to a charge and discharge test, to thereby measure the cell resistivity of the RF battery. The charge and discharge test was performed under the following conditions: an end-of-discharge voltage of 1 V, an end-of-charge voltage of 1.6 V, and a current of 25 A. An evaluation for cell resistivity was performed in the following manner: charge-discharge curves were created on the basis of the charge and discharge test, and the cell resistivity in a charge-discharge curve of the third cycle was evaluated. For each of Test bodies, Table 1 describes the width Wi of the electrolyte inlets of the main groove portions, the width Wr of the supply flow directing portions in the direction orthogonal to the direction in which the main groove portions are arranged adjacent to one another, the width ratio Wr/Wi between the width Wi and the width Wr, and the cell resistivity. Incidentally, in each example, plural main groove portions all have the same shape and size, and each groove portion has a constant width in the longitudinal direction and in the depth direction. The supply flow directing portions have a constant width in the longitudinal direction.

TABLE 1

| Test body | Math groove portions Width Wi (mm) | Supply flow directing portions Width Wr (mm) | Width ratio Wr/Wi | Cell resistivity ($\Omega \cdot cm^2$) |
| --- | --- | --- | --- | --- |
| A | 0.5 | 0.75 | 1.5 | 0.63 |
| B | 4 | 7.5 | 1.5 | 0.67 |
| C | 3 | 15 | 5 | 0.61 |
| D | 0.5 | 5 | 10 | 0.65 |
| E | 5 | 50 | 10 | 0.62 |
| F | 1 | 0.5 | 0.5 | 0.77 |
| G | 0.3 | 0.3 | 1 | 0.74 |
| H | 0.3 | 405 | 15 | 0.72 |
| I | 7 | 7 | 1 | 0.80 |
| J | 7 | 105 | 15 | 0.73 |

Table 1 has demonstrated that Test body A to Test body E, which satisfy a width ratio Wr/Wi of 1.5 or more and 10 or less, enable a reduction in the cell resistivity of the RF batteries. This is probably because the widths Wr of the supply flow directing portions are sufficiently larger than the widths Wi of the main groove portions, which enabled suppression of clogging of the supply flow directing portions caused by unwanted substances that can enter the electrolytes, and enabled successful capture of such unwanted substances at the inlets of the main groove portions. On the other hand, it has been demonstrated that, when Wr/Wi is less than 1.5 or more than 10, the RF battery has a high cell resistivity. This is probably caused for the following reason. In Test body F and Test body G, since the widths Wr of the supply flow directing portions are excessively small, unwanted substances probably clogged the supply flow directing portions, and electrolytes were not sufficiently supplied to electrodes. In Test body H, since the width Wi of the main groove portions is excessively small, the flow resistance against the electrolytes was probably increased. In Test body I and Test body J, since the widths Wi of the main groove portions are excessively large, unwanted substances flowed into electrodes, gas was generated in the electrodes by catalysis of the unwanted substances, and the gas remained in the electrodes, which probably resulted in a reduction in the electrode areas for battery reactions.

REFERENCE SIGNS LIST 1 redox flow battery (RF battery)
2, 2A, and 2B cell frames
3, 3A, and 3B bipolar plates
  31 main groove portion; 31i inlet; 31o outlet
  31a introduction-side main groove portion; 31b drainage-side main groove portion
  32 distribution groove portion (supply flow directing portion)
  33 collection groove portion (drainage flow directing portion)
  34 ridge portion
4, 4A, and 4B frame bodies
  41 liquid supply-side part; 42 liquid drainage-side part; 43 coupling part
  44 liquid supply manifold; 45 liquid drainage manifold
  46 liquid supply guide groove; 47 liquid drainage guide groove
  48 supply flow directing portion; 48s cutout portion
  49 drainage flow directing portion; 49s cutout portion
5 sealing member; Ss sealing groove
100 battery cell
101 membrane
102 positive electrode cell; 103 negative electrode cell
104 positive electrode; 105 negative electrode
100P positive electrode circulation mechanism; 100N negative electrode circulation mechanism
106 positive electrolyte tank; 107 negative electrolyte tank
108, 109, 110, and 111 ducts
112 and 113 pumps
200 cell stack; 200S substack
210 and 220 end plates; 230 coupling member

The invention claimed is:

1. A cell frame comprising a bipolar plate in contact with an electrode constituting a battery cell; and a frame body surrounding a periphery of the bipolar plate,
   wherein the frame body includes a liquid supply manifold through which an electrolyte is supplied into the battery cell,
   the bipolar plate includes, in a surface facing the electrode, a plurality of main groove portions that are arranged adjacent to one another and through which the electrolyte flows,
   at least one of the frame body and the bipolar plate includes a supply flow directing portion configured to distribute, in a direction in which the main groove portions are arranged adjacent to one another, the electrolyte supplied through the liquid supply manifold, to supply the electrolyte to each of the main groove portions, and
   each of widths Wi of electrolyte inlets of the main groove portions, and a width Wr of the supply flow directing portion in a direction orthogonal to the direction in which the main groove portions are arranged adjacent to one another, satisfy a width ratio Wr/Wi of 1.5 or more and 10 or less.

2. The cell frame according to claim 1, wherein the width Wr of the supply flow directing portion satisfies 0.75 mm or more and 50 mm or less.

3. The cell frame according to claim 1, wherein the widths Wi of the inlets of the main groove portions satisfy 0.5 mm or more and 5 mm or less.

4. The cell frame according to claim 1, wherein the supply flow directing portion includes a cutout portion formed in the frame body so as to extend in the direction in which the main groove portions are arranged adjacent to one another, and
   the inlets of the main groove portions are formed so as to be connected to the cutout portion.

5. The cell frame according to claim 1, wherein the supply flow directing portion includes a distribution groove portion formed in the bipolar plate so as to be connected to the inlets of the main groove portions and so as to extend in the direction in which the main groove portions are arranged adjacent to one another, and the frame body includes a liquid supply guide groove that connects the distribution groove portion and the liquid supply manifold to each other.

6. A cell stack comprising the cell frame according to claim 1.

7. A redox flow battery comprising the cell stack according to claim 6.

8. The cell frame according to claim 1, wherein the bipolar plate includes conductive plastics formed from graphite and a polyolefin organic compound or a chlorinated organic compound.

* * * * *